United States Patent
Olson et al.

(10) Patent No.: US 10,039,975 B2
(45) Date of Patent: Aug. 7, 2018

(54) TECHNIQUES FOR REPRESENTING IMAGINARY PARTICIPANTS IN AN IMMERSIVE PLAY ENVIRONMENT

(71) Applicant: Disney Enterprises, Inc., Burbank, CA (US)

(72) Inventors: Joseph Olson, Los Angeles, CA (US); Blade Olson, Silver Lake, CA (US); Michael P. Goslin, Sherman Oaks, CA (US); Charles Moneypenny, Burbank, CA (US); Ivone Alexandre, Glendale (CA)

(73) Assignee: Disney Enterprises, Inc., Burbank, CA (US)

( * ) Notice: Subject to any disclaimer, the term of this patent is extended or adjusted under 35 U.S.C. 154(b) by 198 days.

(21) Appl. No.: 14/596,115

(22) Filed: Jan. 13, 2015

(65) Prior Publication Data

US 2016/0199730 A1    Jul. 14, 2016

(51) Int. Cl.
  *A63F 13/28* (2014.01)
  *A63F 13/216* (2014.01)
  *A63F 13/537* (2014.01)

(52) U.S. Cl.
  CPC ............ *A63F 13/28* (2014.09); *A63F 13/216* (2014.09); *A63F 13/537* (2014.09)

(58) Field of Classification Search
  CPC ........ A63F 13/28; A63F 13/537; A63F 13/12; A63F 13/5252; A63F 13/216; G06F 3/011; H04L 67/38; G06T 19/006; G05B 2219/3201; G05B 2219/39449; G05B 2219/39451; G06K 9/00671
  See application file for complete search history.

(56) References Cited

U.S. PATENT DOCUMENTS

| | | |
|---|---|---|
| 8,456,298 B2 | 6/2013 | Valtonen |
| 8,625,855 B2 | 1/2014 | El Dokor |
| 8,831,826 B2 | 9/2014 | Ricci |
| 2008/0192005 A1 | 8/2008 | Elgoyhen et al. |
| 2009/0265671 A1 | 10/2009 | Sachs et al. |
| 2012/0036433 A1 | 2/2012 | Zimmer et al. |

(Continued)

FOREIGN PATENT DOCUMENTS

WO    WO 2014188393 A1 * 11/2014 ........... G06T 19/006

OTHER PUBLICATIONS

Medal of Honor—Pacific Assault—Directors Edition DVD, 2004, Electronic Arts.*

(Continued)

*Primary Examiner* — Werner Garner
(74) *Attorney, Agent, or Firm* — Patterson + Sheridan, LLP

(57) ABSTRACT

An immersive play environment providing techniques for generating an imaginary enemy within the environment is disclosed. A tracker device is provided in the play environment for determining a location of a user. A controller device is provided to generate an invisible interactive object (an "imaginary enemy"), to engage the user during gameplay. The controller device generates tracking information indicating a location of the imaginary enemy. The controller device determines the location of the enemy relative to the location of the user and transmits that information to the tracker device. The tracker device can communicate the location of the imaginary enemy to the user for engagement.

20 Claims, 6 Drawing Sheets

(56) References Cited

U.S. PATENT DOCUMENTS

| | | | |
|---|---|---|---|
| 2012/0264510 A1* | 10/2012 | Wigdor | A63F 13/213 |
| | | | 463/31 |
| 2013/0278501 A1 | 10/2013 | Bulzacki | |
| 2013/0328763 A1 | 12/2013 | Latta et al. | |
| 2014/0055396 A1 | 2/2014 | Aubauer et al. | |
| 2014/0071076 A1 | 3/2014 | Dogra et al. | |
| 2014/0105421 A1* | 4/2014 | Inagaki | H03G 7/00 |
| | | | 381/107 |
| 2014/0176528 A1* | 6/2014 | Robbins | G02B 27/225 |
| | | | 345/419 |
| 2014/0184496 A1 | 7/2014 | Gribetz et al. | |

OTHER PUBLICATIONS

Bob Colayco, Call of Duty Walkthrough, Jan. 18, 2006, GameSpot.*
Brad Russel, Call of Duty: World at War—Walkthrough/guide, Feb. 12, 2009, IGN.*
Greg Noe, Call of Duty: World at War, The First Hour.*
LazarouDave, Mk2 Grenade, Jan. 12, 2015, Call of Duty Wiki.*
Picard, Call of Duty: World at War Screenshots, Nov. 30, 2008, MobyGames.*
Munawar Bijani, Three-D Velocity, Apr. 9, 2011, BPCPrograms.*
Urban et al. "Recognition of Arm Gestures Using Multiple Orientation Sensors: Repeatability Assessment", 2004 IEEE Intelligent Transportation Systems Conference, Washington, D.C., USA, Oct. 3-6, 2004, 6 pages, <http:/ieeexplore.ieee.org/xpl/login.jsp?tp=&arnumber=1398960&url=http%3A%2F%2Fieeexplore.ieee.org%2Fxpls%2Fabs_all.jsp%3Farnumber%3D1398960>.
Kang et al. "Recognition-based gesture spotting in video games", available online Aug. 4, 2004, 14 pages <http://www.sciencedirect.com/science/article/pii/S0167865504001576>.

\* cited by examiner

TECHNIQUES FOR REPRESENTING IMAGINARY PARTICIPANTS IN AN IMMERSIVE PLAY ENVIRONMENT

BACKGROUND

Field

Embodiments of the present disclosure generally relate to inter-device communications, and more specifically to techniques for using interactive devices to present cues to suggest the presence of imaginary elements in an immersive play.

Description of the Related Art

Many approaches exist for delivering a play experience to a user. For instance, video games engage participants using interactive game play using a video game console, a hand-held controller, and a display (e.g., a television, a monitor on the video game system, etc.). A participant interacts with the controller to send commands to the video game system to control a video game or other simulation. However, while video games allow participants to interact directly with the video game system, such interactions are often limited to the graphical depiction shown on the display and rarely influence any other objects outside of the world provided by the video game.

An immersive playtime environment addresses such limitations by simulating a play experience in a physical environment (e.g., a living room, a car, a city park) using a combination of devices, such as a controller device, wearable sensors, etc. The devices are used to engage the user in a variety of ways. For example, a controller device could detect that a user has performed a particular action, such as firing a toy laser gun at a toy object and, in response, cause other devices in the environment (e.g., such as the toy object) to perform audiovisual effects, creating a feeling of sensory immersion for the user, thus providing an enhanced sense of realism.

SUMMARY

One embodiment disclosed herein provides an immersive play experience platform. The immersive play experience platform includes a sensor device configured to generate tracking information corresponding to a location of a user wearing the sensor device in a physical space. The platform also includes a controller device configured to perform an operation for presenting a scenario suggesting the presence of imaginary elements in the immersive play experience. The operation generally includes receiving first tracking information from the sensor device. The operation also includes generating one or more cues suggesting the presence of one of the imaginary elements. The operation also includes presenting the one or more cues to the user.

Another embodiment described herein provides a method for presenting a scenario suggesting the presence of imaginary elements in an immersive play experience. The method generally includes receiving first tracking information. The method also includes generating one or more cues suggesting the presence of one of the imaginary elements. The method also includes presenting the one or more cues to the user.

Yet another embodiment described herein provides a computer-readable storage medium storing instructions, which, when executed on a processor, perform an operation for presenting a scenario suggesting the presence of imaginary elements in an immersive play experience. The operation generally includes receiving first tracking information. The operation also includes generating one or more cues suggesting the presence of one of the imaginary elements. The operation also includes presenting the one or more cues to the user.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
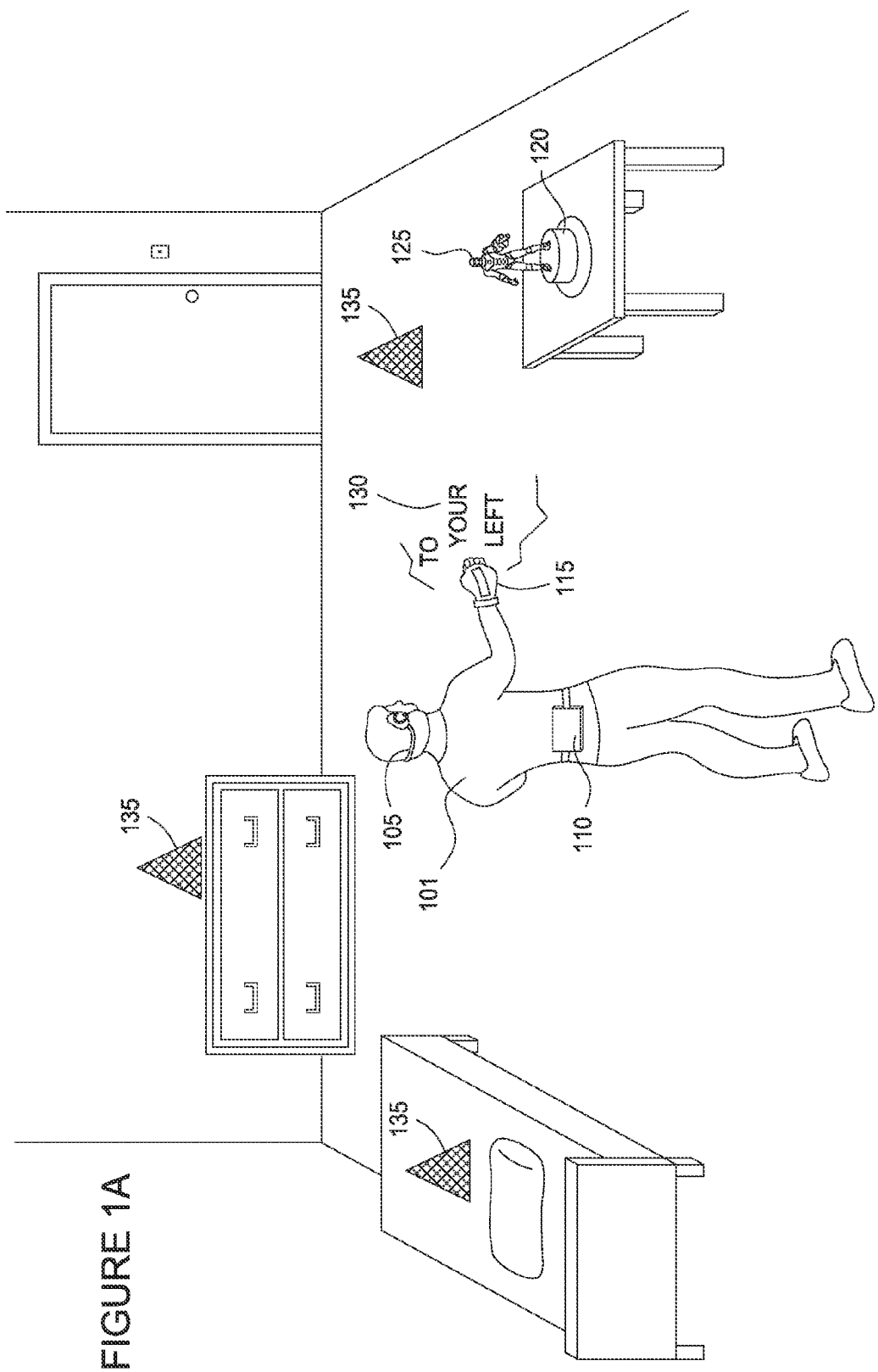
FIGS. 1A and 1B illustrate a playtime environment where a controller device generates an imaginary enemy to engage a participating user, according to one embodiment.

An immersive play environment uses a plurality of interactive devices configured within a given setting (e.g., a living room, a vehicle, a park) to provide sensory entertainment experience to the user, giving the user the illusion of being in another setting (e.g., a forest on a different planet, a flight hangar, a sports arena, etc.). For example, a controller device could detect that a user performs an action using a prop device, such as a toy gun that transmits signals to the controller device whenever fired at a target, e.g., an interactive toy object. In response, the controller device can cause the interactive devices to perform audiovisual effects such as blast sounds from the toy gun, reaction sounds from the toy object, etc. The controller device could also cause the interactive toy object to perform physical movement, such as falling over or jumping.

One challenge in delivering an immersive play experience to a user is providing a cost-effective way to provide objects that the user can personally interact with in the play environment, such as opponents to engage in battle. An approach for doing so is providing an interactive toy object, such as an action figure that can be mounted on an action disc device. When mounted to the action disc device, the action figure can be loaded with a script, which, when executed, performs a variety of audiovisual effects. The user can engage the action figure, such as by attacking the figure with a toy gun, martial arts moves, etc. However, because of the logic and capabilities contained within the action figure, such figures may be costly to produce. Further, because a user may want variety in action figures, buying multiple figures may be cost-prohibitive to the user due to high production values.

Embodiments presented herein describe techniques for presenting cues to a user suggesting the presence of imaginary elements (e.g., enemies, vehicles, etc.) as part of an immersive play environment. In one embodiment, the cues may suggest the presence, behavior, and state of non-physical elements, such as an enemy to engage a user as part of a play experience. The imaginary elements may be include variable positional information that can be broadcast to the user. In addition, the interactive devices in the play environment can generate audiovisual effects to accompany the imaginary elements.

In one embodiment, a controller device in the play environment receives position and orientation information of the participant. For example, the user may wear a tracking device equipped with sensors. The tracking device may be integrated with a toy associated with the immersive environment (e.g., a toy weapon) or a wearable sensor. The controller device generates cues to suggest aspects of an imaginary enemy, such as a location and accompanying audio and lighting effects. The cues lead the user to rely on imagination to provide the remaining context of the imaginary enemy. For instance, the controller device may generate position coordinates relative to the tracking device that represent a location of the imaginary elements. The controller device may also generate cues such as distinct audio, status attributes (e.g., health points, attack level, defense level, position, speed, magical or supernatural powers or physical capabilities, etc.) to associate with the imaginary enemy. In addition, the controller device may execute logic for presenting a scenario guiding the user through a play experience with aspects of the imaginary enemy manifested by feedback from the user. Based on such feedback, the controller device can generate additional cues (e.g., play additional sounds) and modify position information to provide the illusion that the imaginary enemy is actually moving within the environment.

The user can engage the imaginary enemy in similar ways that the user would engage interactive physical toy object in the play environment. For example, a toy gun could announce a current position of the imaginary enemy. In turn, the participant could aim and fire the gun at the announced position. The controller device may track whether the shot hit the imaginary enemy based on position information relative to the aim and on timing (i.e., how long after the announcement was the shot fired). In response, the controller device could play sound effects of a blast hitting the imaginary enemy. The logic within the device can also adjust statistics of the imaginary enemy in response, such as hit points or strength.

Advantageously, generating cues used to suggest a presence of imaginary elements within the immersive play environment provides a play experience for the user with a limited number of devices. Further, the range of elements may be broad, as the same cues may be used in many ways. That is, the cues can suggest different imaginary characters (e.g., enemies, allies, vehicles, etc.) that can guide the user through a scenario in the play experience. A play environment platform generates the imaginary enemy based by tracking a position and orientation of a participant, thus allowing the system to manage cues about the imaginary elements relative to his or her own tracked position and orientation. Thus, the play environment can deliver a cost-effective method of providing participants with a variety of interactive experiences. Further, an imaginary enemy provides a greater latitude of engagement for the user, e.g., by moving around in various locations of the play environment, by prompting the user to perform some action (e.g., if the imaginary enemy is a vehicle, the user may be prompted to avoid being struck by the moving vehicle), and also by taking advantage of the physical environment through beaconing devices (as described below). As a result, generating imaginary elements can enhance the play experience of the user.

Figure 1B:
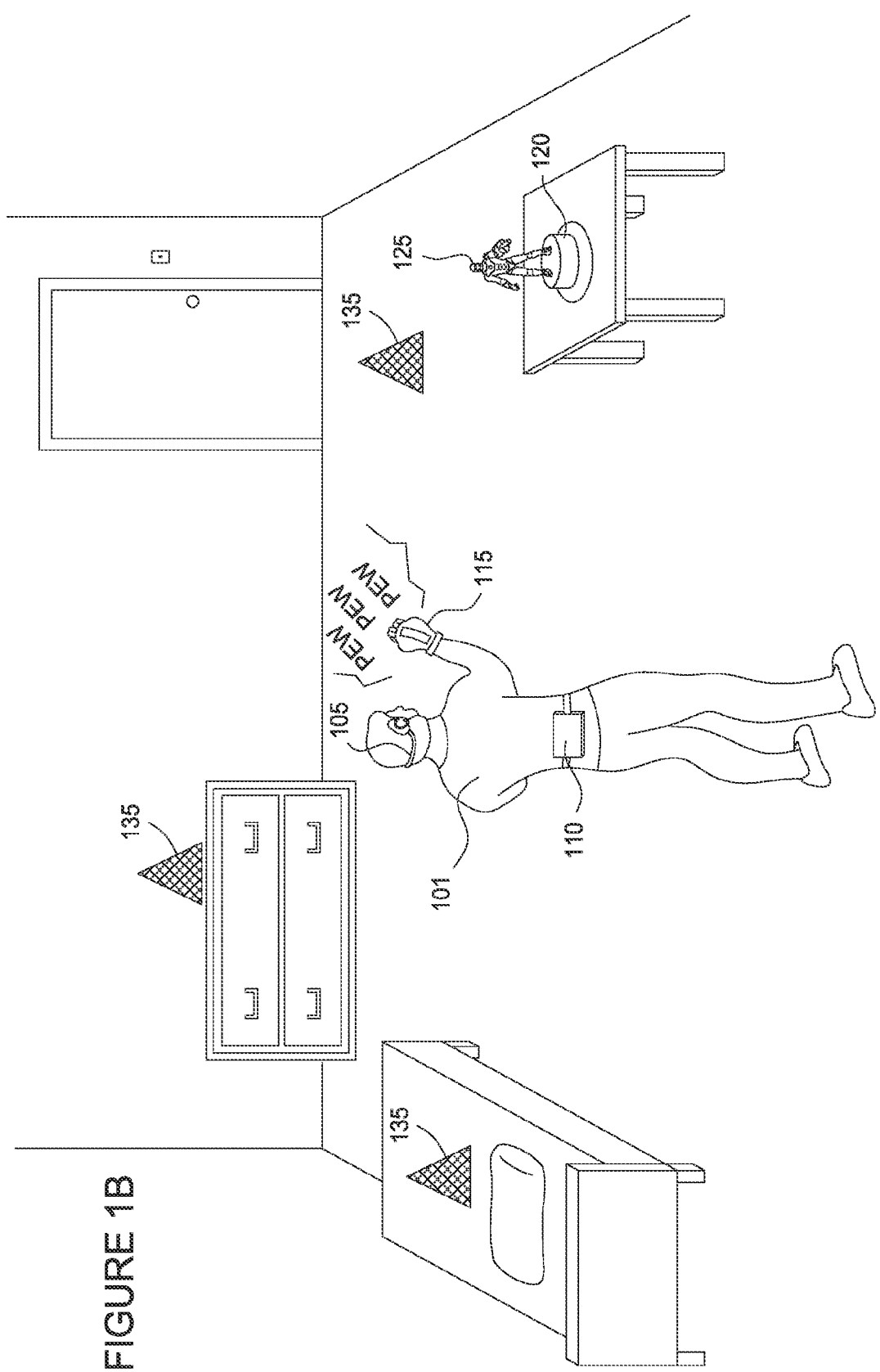

FIGS. 1A and 1B illustrate a playtime environment where a controller device generates an imaginary enemy to engage a participating user, according to one embodiment. FIG. 1A shows a participant 101 in a room. Illustratively, the participant 101 is wearing a headset 105, controller device 110, and a tracking device 115. Of course, the particular devices provided may depend on a given scenario with imaginary elements being presented. Further, the controller device may also reconfigure the scenario based on the presence of certain devices. For example, a given toy object being present may open an particular storyline associated with the toy object.

In one embodiment, the headset 105 projects audio (e.g., transmitted from the controller device 110) to the user. Such audio may be noise representing a setting of the play environment (e.g., a forest, an enemy headquarters, a sports arena, etc.), play-by-play, instructions, sound effects appearing to come from an interactive object, and the like. The audio may also be played from ambient speakers or other audio devices.

In one embodiment, the tracking device 115. The tracking device 115 includes accelerometers and a gyroscope. Each accelerometer measures acceleration of the tracking device 115 in one of an x, y, and z directions. The gyroscope measures yaw, roll, and pitch of the tracking device. The combination of the accelerometer and the gyroscope provide nine-degrees-of-freedom for tracking a position and orientation of the user equipped with the tracking device 115.

Illustratively, the tracking device 115 is a phaser glove that acts as a toy blaster that can fire laser blasts represented in the play experience, e.g., using audiovisual effects. For example, the user can aim and "fire" the phaser glove at an interactive object in the play environment, such as at an action figure 125 mounted on an action disc device 120. Note, other props may be used in place of the phaser glove. For example, the tracking device 115 can be provided in a toy sword that allows a user to engage objects during the play experience. The action figure 125 and action disc device 120 can respond with audiovisual effects.

However, while the action figure 125 is capable of producing audiovisual effects, the action figure 125 might not be configured with logic to determine when conditions in the physical environment indicate a particular effect should be performed. This may be due to, in part, the cost and complexity of configuring the action figure 125 with the logic and hardware resources to detect stimuli in the physical environment and to perform a contextually appropriate audiovisual effect in response synchronously with other devices. As such, the action figure 125 could be configured to receive commands (e.g., from controller device 110) and to perform an audiovisual effect(s) responsive to the received commands.

While the action figure 125 may include hardware resources to perform the audiovisual effects discussed above, other embodiments may include toy devices that possess limited or no interactive capabilities. Such embodiments may be preferable, for example, when seeking to minimize the expense of manufacturing the toy devices. In such an embodiment, the interactivity of the toy devices may be achieved by configuring each of the inert toy devices with the action disc device 120. Generally, the action disc device 120 provides a modular way to incorporate interactivity into a compatible device (e.g., the action FIG. 125) within a networked ecosystem of devices. For instance, the action disc device 120 could be configured to receive commands broadcast from the controller device 110 and to perform an audiovisual action in response (e.g., using one or more of the light emitting devices, speaker devices, vibration devices, and spring-loaded actuator).

In one embodiment, the play environment presents the user with cues suggesting the presence of non-physical elements, e.g., imaginary enemies, in the environment. For example, the cues may be audio played to the participant 101 suggesting a location of an imaginary enemy. The play environment also manages aspects of the imaginary enemy, such as tracking data and status attributes. The participant 101 can interact with non-physical entities based on such cues and aspects. In one embodiment, the controller device 110 creates tracking information (e.g., position, orientation) of the imaginary enemy relatives to the user's own tracking information. The controller device 110 can determine where to generate the imaginary enemy based on the game logic and scenario.

As stated, the cues generated by the controller device 110 can include audio indicating a location of the imaginary enemy. The controller device 110 can send audio instructions for playback to the tracking device 115 (or the headset 105) announcing the location of the imaginary enemy. For example, FIG. 1A depicts the tracking device 115 providing a cue announcing a position of the imaginary enemy, "ENEMY TO YOUR LEFT," indicating that the imaginary enemy is to the left side of the participant 101. In addition, the cues may also include targets generated by the controller device 110 indicating the location of an enemy. The target may be represented as an invisible sphere within mapped in a virtual space (e.g., mapped by the controller device 110 to the physical room).

FIG. 1B depicts the participant 101 turning to the left and firing the glove in the announced direction. Assume that after the user aims and fires in the general direction of the targets representing the imaginary enemy. The controller device 110 may compute an intersection of an invisible line representing the trajectory of the blast and the target sphere to determine whether the user successfully hit the imaginary enemy (with some configurable allowance). The controller device 110 can present additional cues indicating the outcome of the shot based on the movement, aim, and timing of the shot, e.g., by transmitting instructions to cause audio corresponding to the imaginary enemy to play in response to being hit (e.g., from the headset 105, the action disc device 120). In addition, the controller device 110 can update a set of status attributes associated with the imaginary enemy, such as hit points, strength, defense, speed, etc. As a result, when the imaginary enemy is successfully hit, the controller device 110 can decrement the hit points of the enemy. In addition, the controller device 110 instruct the glove to provide audio feedback to the participant 101, e.g., "Wow, that shot staggered him!"

Further, unlike a physical toy object that can respond to certain conditions, the cues presented to suggest the behavior, state, and position of an imaginary element provides a greater range of latitude for the play environment do conduct scenarios for the participant 101. For instance, the controller device 110 can manage cues representing a location of an imaginary enemy in the physical space, e.g., in response to the user successfully hitting the enemy, the controller device 110 can change the tracking coordinates representing where the imaginary enemy is. As another example, the controller device 110 can present cues using one or more beaconing devices 135 placed in different parts of a physical setting. As another example, the controller device 110 can guide the user in engaging an imaginary enemy. For example, the controller device 110 can include cues that indicate that an imaginary enemy has a weak spot in its back. The controller device 110 can instruct the user to move in specific spots of the play environment and aim at a certain location when attacking the imaginary enemy. As the user moves, the tracking device 115 sends sensor data to the controller device 110. The controller device 110 can evaluate the sensor data to determine whether a given move was performed correctly. If so, the controller device 110 can provide additional instructions to continue the sequence. If not, the controller device 110 can provide instructions to correct user movement, As shown in FIGS. 1A and 1B, beaconing devices 135 are positioned on the bed near the door and on a dresser. Each beaconing device 135 broadcasts its position to the controller device 110. The user can register the location of each beaconing device to represent a feature of the immersive environment. That is, each beaconing device may be tied to an element of a storyline or scenario of an immersive play experience. For example, the user could register the beaconing device placed on the bed as a cliff location. As a result, the controller device 110 can send audio through the headset announcing that the imaginary enemy is on the cliff. Similarly, assume the user registers the beaconing device placed on the bad as a gateway. As part of an example storyline, the controller device 110 can then send instructions through the headset announcing that the imaginary enemy is escaping towards the gateway and that the user should block the gateway to prevent the escape. Generally, the beaconing devices 135 enhance the interactivity between the user and the imaginary enemy. The number of beaconing devices 135 required can depend on the storyline. In one embodiment, the storyline might adapt based on the number of beaconing devices 135 present.

Figure 2:
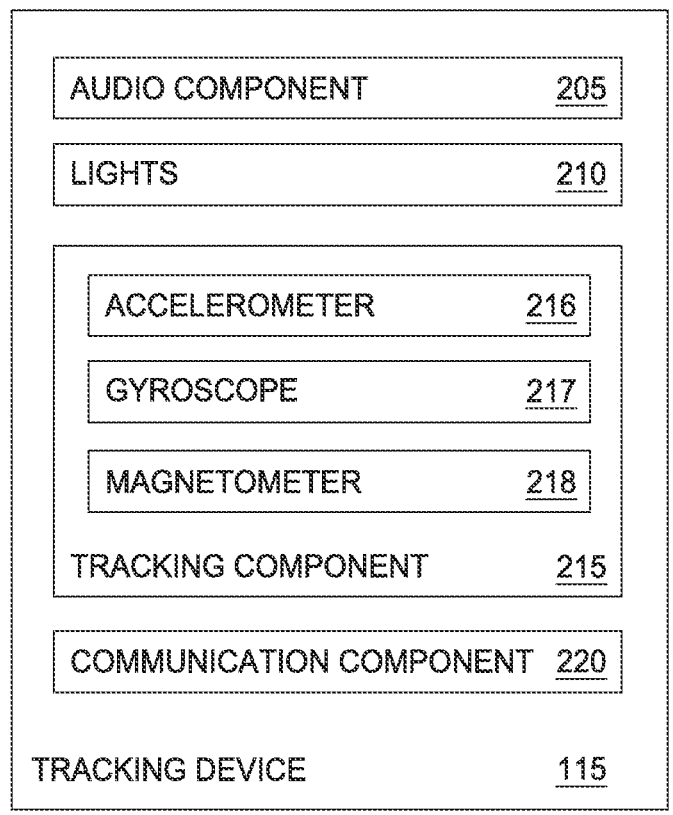
FIG. 2 illustrates a tracking device, according to one embodiment.

FIG. 2 further illustrates the tracking device 115, according to one embodiment. As shown, the tracking device 115 includes an audio component 205, one or more lights 210, a tracking component 215, and a communication component 220. The audio component 205 and lights 210 combine to provide audiovisual effects for the phaser glove during a play experience. For example, assume that the user targets an interactive object and fires the phaser glove via a trigger. The audio component 205 may produce blast noises as a result. Further, the light emitting devices may flash lights when the user fires phaser glove. Audio files for blast noises may reside within the audio component 205.

In one embodiment, the tracking component 215 includes an accelerometer 216, a gyroscope 217, and a magnetometer 218. The accelerometer 216, gyroscope 217, and magnetometer 218 combine to track position and orientation information of the tracking device 115. Because the user wears the tracking device 115 during the play experience, the position and orientation information also correlate to the user. The communication component 220 may include radio-frequency transmitters that send and receive signals from the controller device 110. In one embodiment, communication component 220 transmits the position and orientation information to the controller device 110. Further, the communication component 220 also receives audio data from the controller device 110 indicating a location of an imaginary enemy within the play environment. The audio component 205 may reproduce the audio sent from the controller device 110 to the user.

Figure 3:
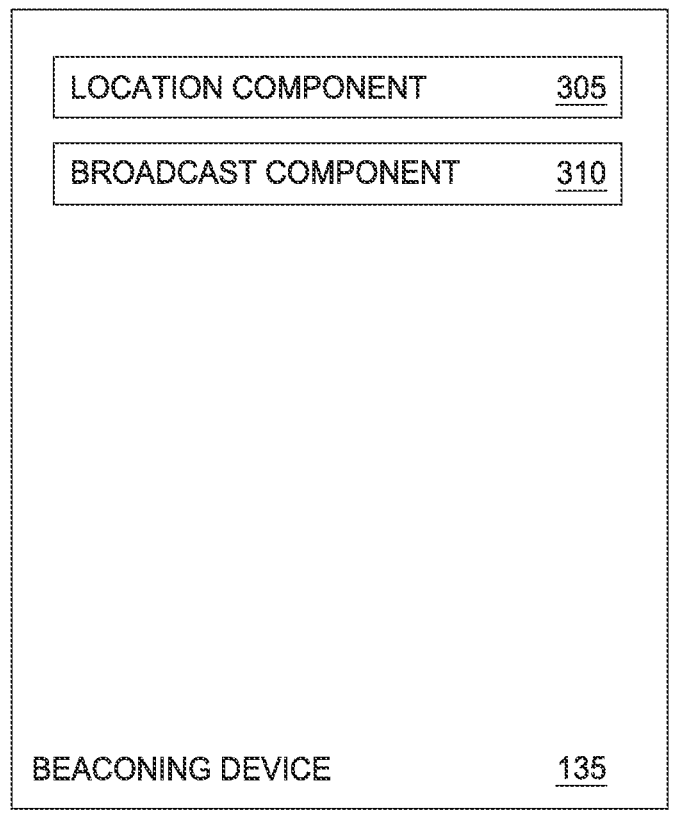
FIG. 3 illustrates a beaconing device configured to map a physical environment to an immersive play environment, according to one embodiment.

FIG. 3 illustrates an example beaconing device 135 configured to map a physical environment to an immersive play environment, according to one embodiment. As stated, the play environment may include one or more beaconing devices 135 placed in a physical environment (e.g., a room, a car, a park, etc.) to define features (e.g., hills, cliffs, enclosures, etc.) of the play environment. As shown, the beaconing device 135 includes a location component 305 and a broadcast component 310.

The location component 305 determines position information of the beaconing device 135 relative to a given physical space. The broadcast component 310 transmits (e.g., via radio frequency signals) the position information to the controller device 110. The controller device 110 can then register the location of the beaconing device 135 prior to initiating a given play experience. Further, the user can define a feature for a location marked by the beaconing device 135. For example, the user can place a beaconing device 135 on a bed and assign that particular location as a cliff in the play environment. The controller device 110 can associate the position of the beaconing device in the physical space as representing a location of a cliff, for purposes of the play experience.

Once configured, the beaconing device 135 allows the controller device 115 to present cues to the user representing an imaginary enemy being present at a defined location, e.g., as part of a choreographed scenario. Continuing the previous example of the cliff, the controller device 110 can instruct the user (e.g., via audio feedback) to jump off from the cliff to attack the imaginary enemy. As the user does so (i.e., climbs and jumps from the bed), the tracking device 115 receives tracking information corresponding to the location of the user and transmits the information to the controller device 110.

Figure 4:
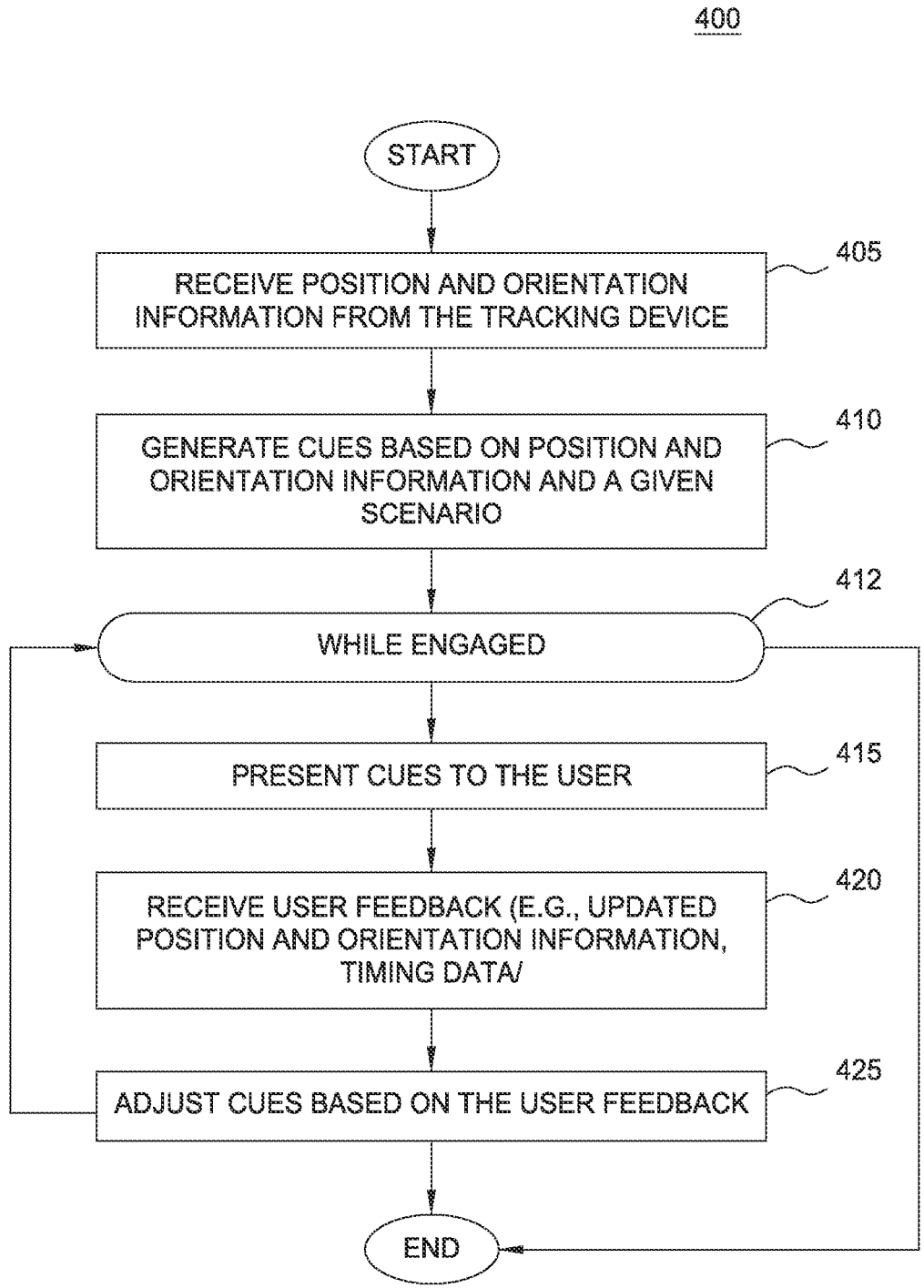
FIG. 4 illustrates a method for engaging participants in an immersive play environment presenting cues imaginary elements in the play environment, according to one embodiment.

FIG. 4 illustrates a method 400 for presenting cues to a participant suggesting the presence of an imaginary element in an immersive play environment, according to one embodiment. Method 400 begins at step 405, where the controller device 110 receives position and orientation information from the tracking device 115. Because the user equips the tracking device 115 during gameplay, the position and orientation information is used to represent a location of the user.

At step 410, the controller device 110 initiates an encounter with imaginary elements by generating cues based on the position and orientation of the user. In addition, the controller device 110 may generate the cues based on a present scenario identified in the game logic. For example, the scenario may indicate that the user has encountered an enemy fighter. Although the enemy fighter does not have a corresponding physical form in the play environment, the cues may indicate its presence. Such cues may include audio appearing to come from the enemy, audio to be played from the tracking device indicating the location of the enemy, etc. Cues may also include invisible targets (having a location in virtual space) representing the imaginary enemy, e.g., an invisible sphere used to determine whether a user has successfully hit the imaginary enemy. Further, the controller device 110 may generate aspects associated with the enemy, such as location data and status attributes (e.g., health, strength, speed, etc.). Once generated, the controller device 110 can "engage" the user.

At step 415, the controller device 110 presents the cues to the user. For example, the controller device 110 may transmit audio to the audio component 205 announcing the presence of an enemy at a specified location (e.g., to the user's left, above the user, etc.). The user may then respond to the cues, e.g. by aiming a phaser glove in the direction indicated and firing, moving across the room, etc.

At step 420, the controller device 110 receives the user feedback, such as updated position and orientation information and response time from when the user received the announcement to when the user fired the phaser glove. At step 425, the controller device 110 adjusts the cues based on the user feedback. For example, the controller device 110 can evaluate the position and orientation of the tracking device 115, the position of the invisible targets, and the timing of a user's blast to determine whether the user successfully hit the enemy. If so, the controller device 110 can transmit audio feedback to be played from the tracking device 115 (e.g., "You got him!") and announce a new location for the enemy (e.g., "The enemy moved to the right!"). Similarly, if the controller device 110 determines that the user missed, the controller device 110 can provide other feedback, such as "Try again! A little more to the left!", to be played from the tracking device 115.

Further, the controller device 110 can adjust aspects based on the user feedback as well. For example, the imaginary enemy have an associated state and status attributes, such as health, strength, speed, etc. If the user successfully "hits" the imaginary enemy, the controller device 110 can deduct points from the enemy health. Likewise, the controller device 110 can present cues to the user indicating the presence of stronger enemies each time the user "defeats" a given enemy.

The engagement may continue until the scenario is completed or some condition within the scenario is satisfied, e.g., if the player successfully avoids the enemy, defeats the enemy, etc. For instance, assume that the cues generated suggest the presence of an imaginary racecar speeding towards the user. The controller device 110 may issue instructions to the user to move out of the way of the racecar. Upon successful completion (i.e., the controller device 110 receives tracking information indicating that the user has avoided the racecar), the engagement has concluded.

Figure 5:
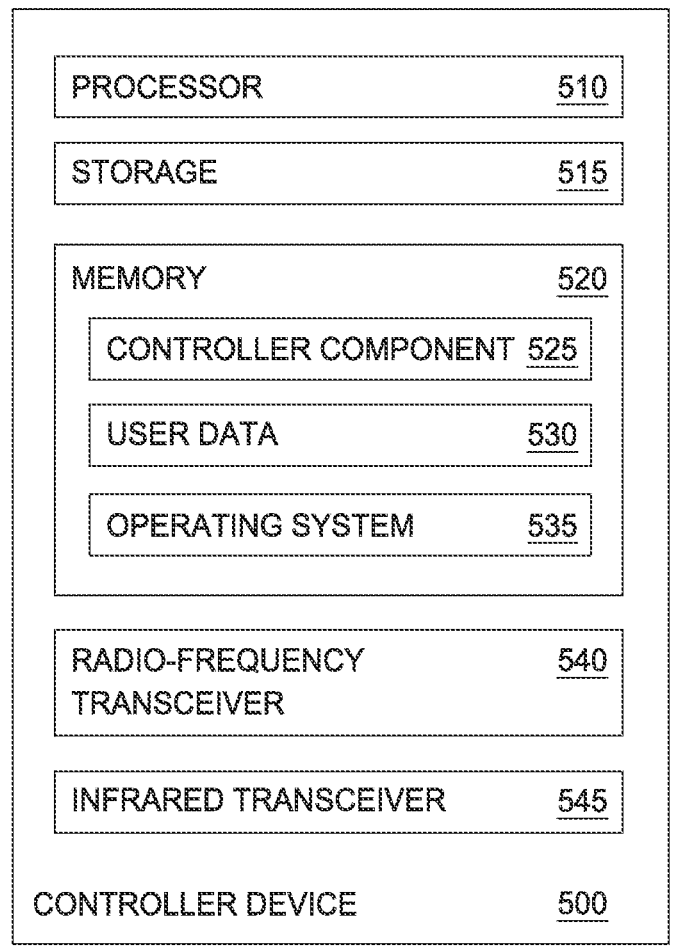
FIG. 5 illustrates a controller device configured to present cues suggesting the presence of imaginary elements in an immersive play environment, according to one embodiment.

FIG. 5 illustrates a controller device configured to generate an imaginary enemy that engages a user in an immersive play environment, according to one embodiment. As shown, the controller device 500 includes a processor 510, storage 515, memory 520, a radio-frequency transceiver 540 and an infrared transceiver 545. Generally, the processor 510 retrieves and executes programming instructions stored in the memory 520. Processor 510 is included to be representative of a single CPU, multiple CPUs, a single CPU having multiple processing cores, GPUs having multiple execution paths, and the like. The memory 520 is generally included to be representative of a random access memory. The radio-frequency transceiver 540 enables the controller device 500 to transmit and receive radio-frequency signals. Likewise, the infrared transceiver 545 allows the device 500 to transmit and receive infrared signals. Further, while the depicted embodiment illustrates the components of a particular controller device 500, one of ordinary skill in the art will recognize that interactive objects may use a variety of different hardware architectures. Moreover, it is explicitly contemplated that embodiments may be implemented using any device or computer system capable of performing the functions described herein.

The memory 520 represents any memory sufficiently large to hold the necessary programs and data structures. Memory 520 could be one or a combination of memory devices, including Random Access Memory, nonvolatile or backup memory (e.g., programmable or Flash memories, read-only memories, etc.). In addition, memory 520 and storage 515 may be considered to include memory physically located elsewhere; for example, on another computer communicatively coupled to the controller device 500.

Illustratively, the memory 520 includes a controller component 525, user data 530 and an operating system 535. The operating system 535 generally controls the execution of application programs on the controller device 500.

Generally, the controller component 525 configures the interactive objects to perform particular actions. The particular actions can also be based on the user data 530 (e.g., historical interactions data between the user and various interactive objects, user preferences data, etc.) and one or more environmental factor (e.g., a room of the house the object is currently in, a time of day, a day of the week, etc.).

For instance, the controller component 525 may configure the tracking device to transmit tracking information (e.g., position and orientation information) identifying a user location. Doing so allows the controller component 525 to present cues suggesting a position of an imaginary enemy based on the tracking information. The imaginary enemy has coordinates and other attributes (such as hit points, strength, speed, etc.).

Further, in one embodiment, the controller component 525 is configured with logic for recognizing particular events and broadcasting commands for the devices to perform a corresponding action(s) in response. In such an embodiment, the controller component 525 could use input/output devices (e.g., cameras, microphones, wireless transceivers, infrared sensors, etc.) to detect when a particular event occurs. For instance, the controller component 525 could use a camera to detect when a particular projection appears, and could then broadcast a command (e.g., using a RF signal) instructing the devices to perform a corresponding action in response.

As another example, the controller component 525 could receive a wireless signal (e.g., an RF signal, data communicated using Bluetooth communications, etc.) from another one of the devices indicating that a particular action has been performed. For instance, the controller component 525 could receive an indication from a tracker device that a user has successfully hit a targeted imaginary enemy. The controller component 525 can then execute game logic responsive to the hit, such as decreasing hit points of the imaginary enemy, changing the location of the imaginary enemy, relaying additional audio instructions to the headset to play for the user, etc.

In a particular embodiment, the controller component 525 is configured to manage multiple devices to cause the devices to perform audiovisual effects synchronously. For instance, the controller component 525 could broadcast a message to the devices, instructing the devices to perform a particular audiovisual effect immediately upon receiving the message, such as when a user successfully strikes an imaginary enemy. As another example, the controller component 525 could broadcast a message to the devices, instructing the devices to perform actions (e.g., play a sound effect, trigger a lighting effect, etc.) according to a schedule. Here, the devices may maintain internal clocks that are synchronized with one another for use in synchronously performing the audiovisual actions.

Generally speaking, the devices and the controller 500 may be implemented a variety of ways consistent with embodiments presented herein. With respect to hardware, embodiments may employ a modular design for maximum hardware reusability across different interactive objects. Such a design could include, for instance, hardware adapters that allow common processors, memories and buses to receive and send data via a multiplicity of sensors, displays, effectors and other means of communication. Additionally, system and/or operating system agnostic sites (e.g., Portals) could be used to ensure maximum compatibility for all users.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. An immersive play experience platform, comprising:
    a sensor device configured to generate tracking information corresponding to a location of a user wearing the sensor device in a physical space;
    a beaconing device associated with a virtual location in the immersive play experience; and
    a controller device configured to perform an operation for presenting a scenario in the physical space suggesting a presence of a plurality of imaginary elements in the physical space, wherein the plurality of imaginary elements are not visually depicted by the immersive play experience platform, the operation comprising:
        receiving first tracking information from the sensor device,
        generating one or more sensory cues suggesting a presence of at least a first imaginary element of the plurality of imaginary elements in the physical space, wherein the plurality of imaginary elements are not visually depicted by the immersive play experience platform, and
        presenting the one or more sensory cues to the user, wherein the one or more sensory cues indicate that the first virtual element is located at the virtual location associated with the beaconing device.

2. The immersive play experience platform of claim 1, wherein the operation further comprises:
    receiving user actions as determined by the sensor device in response to the generated one or more sensory cues; and
    adjusting a profile of the first imaginary element based on the user actions.

3. The immersive play experience platform of claim 2, wherein the profile includes one or more status attributes corresponding to the first imaginary element.

4. The immersive play experience platform of claim 1, wherein the one or more sensory cues include audio representing the first imaginary element.

5. The immersive play experience platform of claim 1, wherein the first tracking information includes at least one of position information and orientation information corresponding to the location of the user.

6. The immersive play experience platform of claim 1, wherein the one or more sensory cues are generated relative to the first tracking information.

7. The immersive play experience platform of claim 1, wherein the one or more sensory cues instruct the user to move from a first location in the physical space to a physical location of the beaconing device in the physical space.

8. The immersive play experience platform of claim 7, wherein the one or more sensory cues additionally instruct the user to perform a specified action at the physical location of the beaconing device.

9. The immersive play experience platform of claim 8, the operation further comprising:
    receiving second tracking information from the sensor device;
    determining, based on the second tracking information, that the user did not complete, within a predefined time limit, the specified action at the physical location of the beaconing device;
    generating one or more updated sensory cues based on the determination that the user did not complete the specified action at the physical location of the beaconing device within the predefined time limit; and
    presenting the one or more updated sensory cues to the user.

10. The immersive play experience platform of claim 8, the operation further comprising:
receiving second tracking information from the sensor device;
determining, based on the second tracking information, that the user completed, within a predefined time limit, the specified action at the physical location of the beaconing device;
generating one or more updated sensory cues based on the determination that the user completed the specified action at the physical location of the beaconing device within the predefined time limit; and
presenting the one or more updated sensory cues to the user.

11. The immersive play experience platform of claim 1, wherein the scenario presented by the controller device requires a predefined minimum number of beaconing devices to be present in the physical space.

12. The immersive play experience platform of claim 1, wherein the scenario presented by the controller device is determined at least in part based on a number of beaconing devices that are present in the physical space.

13. The immersive play experience platform of claim 1, wherein the first imaginary element is invisible and is not visually depicted by the immersive play experience platform when the user has a direct line of sight to the first imaginary element.

14. A method for presenting a scenario in a physical space suggesting a presence of a plurality of imaginary elements in the physical space, wherein the plurality of imaginary elements are not visually depicted by an immersive play experience platform, the method comprising:
receiving first tracking information corresponding to a location of a user in the physical space;
generating one or more sensory cues suggesting a presence of at least a first imaginary element of the plurality of imaginary elements in the physical space, wherein the plurality of imaginary elements are not visually depicted by the immersive play experience platform; and
presenting the one or more sensory cues to the user, wherein the one or more sensory cues indicate that the first virtual element is located at a virtual location in the immersive play experience that is associated with a physical beaconing device.

15. The method of claim 14, further comprising:
receiving user actions in response to the generated one or more sensory cues; and
adjusting a profile of the first imaginary element based on the user actions.

16. The method of claim 14, wherein the first tracking information includes at least one of position information and orientation information corresponding to the location of the user.

17. The method of claim 14, wherein the one or more sensory cues are generated relative to the first tracking information.

18. A non-transitory computer-readable storage medium storing instructions, which, when executed on a processor, perform an operation for presenting a scenario in a physical space suggesting a presence of a plurality of imaginary elements in the physical space, wherein the plurality of imaginary elements are not visually depicted by an immersive play experience platform, the operation comprising:
receiving first tracking information corresponding to a location of a user in the physical space,
generating one or more sensory cues suggesting a presence of at least a first imaginary element of the plurality of imaginary elements in the physical space, wherein the plurality of imaginary elements are not visually depicted by the immersive play experience platform, and
presenting the one or more sensory cues to the user, wherein the one or more sensory cues indicate that the first virtual element is located at a virtual location in the immersive play experience that is associated with a physical beaconing device.

19. The non-transitory computer-readable storage medium of claim 18, wherein the operation further comprises:
receiving user actions in response to the generated one or more sensory cues; and
adjusting a profile of the first imaginary element based on the user actions.

20. The non-transitory computer-readable storage medium of claim 18, the operation further comprising:
instructing the user to move from a first location in the physical space to a second location in the physical space,
upon determining that the user has moved to the second location in the physical space, generating one or more updated sensory cues, and
presenting the one or more updated sensory cues to the user.

* * * * *